March 13, 1956  D. M. MISIC  2,738,203
CRANK TYPE AXLE AND SUSPENSION ASSEMBLY
Filed Feb. 23, 1952
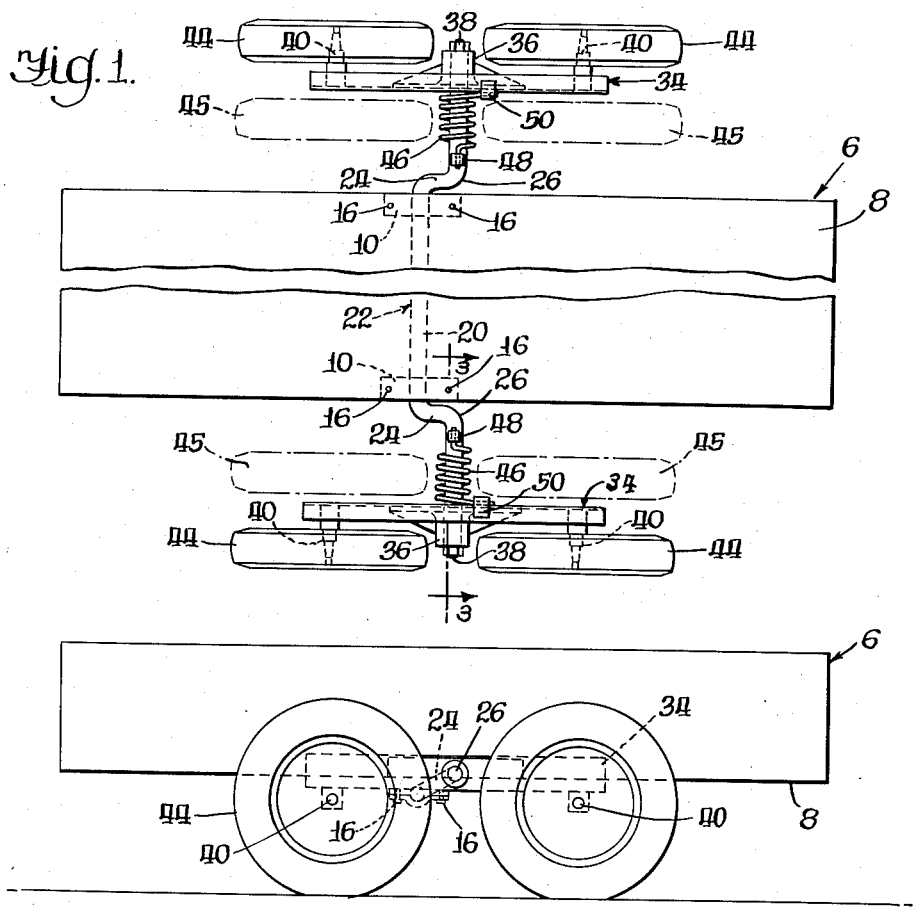
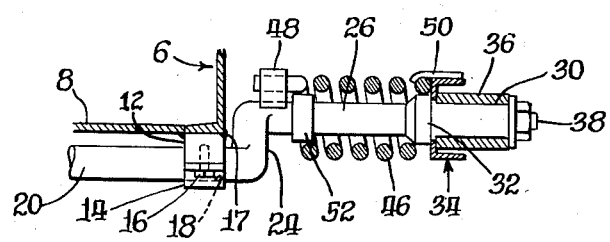
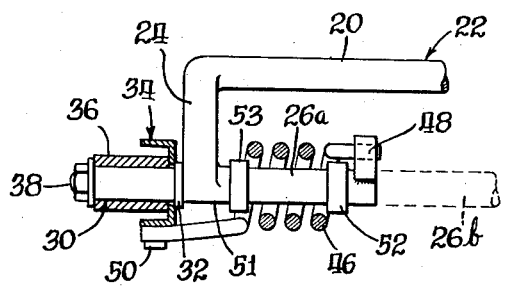
INVENTOR.
Donald M. Misic
BY Orrin O. B. Garner
Atty United States Patent Office 2,738,203
Patented Mar. 13, 1956

2,738,203

CRANK TYPE AXLE AND SUSPENSION ASSEMBLY

Donald M. Misic, Chicago, Ill., assignor to American Steel Foundries, Chicago, Ill., a corporation of New Jersey Application February 23, 1952, Serial No. 272,974

10 Claims. (Cl. 280—104.5)

This invention relates to wheel supporting axles and has specific reference to the type used for smaller trailers or other similar land vehicles.

It is a general object of my invention to provide an axle wherein the bending flexure of a helical spring is utilized to cushion vertical movements of a supported trailer.

A more specific object of the invention is to provide a combination, wherein spindle portions of said axle are in spaced substantially parallel relationship to the axle body, and helical springs are positioned to operatively embrace said spindle portions.

Another specific object of the invention is to provide a combination wherein the cushioning helical springs are arranged to embrace an axle portion other than the axle body.

Still another object of my invention is to provide a combination wherein an axle equalizer assembly permits multiple wheel structure on each side of the trailer.

A still further object of my invention is to provide trailer supporting means having cushioning coil springs mounted outboardly from the trailer body, thereby affording relatively free access for assembly, disassembly and replacement of said springs.

And yet another object of my invention is to provide an axle wheel assembly affording a relatively low center of gravity for a supported trailer.

In the drawings:

Figure 1 is a plan view of my invention;

Figure 2 is a side elevational view of my invention;

Figure 3 is a sectional view taken along lines 3—3 of Figure 1, and

Figure 4 is a fragmentary view of the axle-equalizer assembly showing an altered design of the invention.

It is to be understood that some of the details of the invention are omitted from certain views where it is believed said details are adequately shown in other views.

Describing the invention in detail, the body 6 which may be of a conventional open type used on trailers, has a bottom or floor 8 and secured thereto the transversely spaced bearing means 10 adjacent each side of the body 6. The bearing means 10 consists of the conventional block 12 and demountable cap 14 secured to said block by cap screws 16, or the like. The block 12 is fastened to the underside of the floor 8 as by welding at 17 or other convenient means.

Defined within each of the bearing means 10 is the bushed hole 18, said holes being coaxially disposed transversely of the body to afford journaled connection with a center shaft or portion 20 of the axle, generally designated 22. Thus the axle 22 is free to rotate about the axis of its center portion 20.

Connected to the outer ends of the center portion 20 are the distended throws or arms 24. It is to be noted that the similarly distended arms 24 on the opposite sides of the truck are preferably coplanar. Each arm 24 is merged with the related cylindrical pivotal element 26 which extends outboardly of the body 6 forming an axle 22 having spaced parallel shafts one of which comprises axially spaced portions 26, 26. Each pivotal element or spindle 26 has formed thereon adjacent its ends, a cylindrical bearing surface 30 having its inboard limit defined by an upset portion or annular flange 32.

An equalizer or side frame generally designated 34, and which may be of channelled cross section, has a journal portion 36 rigidly attached thereto, said journal portion being in pivotal sleeved engagement with each bearing surface 30, as the equalizer 34 abuts the annular flange 32. Each equalizer 34 is maintained on the spindle 26 by the conventional washer nut assembly 38. Each equalizer 34 supports adjacent its opposite ends the stub spindles 40, 40. Vehicle wheels 44, including conventional hubs, cones, and bearing assemblies (not shown) are rotatably secured to the spindles. It is to be noted that the stub spindles 40 may be extended through the equalizer affording dual wheel mounting facility, such as shown at 45 in Figure 1.

A helical coil spring 46 is positioned to encircle each pivotal element 26 inboardly of the equalizer 34. Each spring 46 is rigidly secured to the related pivotal element 26 on its inboard end by means of the spring clip 48, which is welded to the pivotal element 26. The outboard end of the spring 46 is fixedly secured to the associated equalizer 34 by means of the spring clip 50, which is welded to the equalizer. To relieve each spring clip 48 of unwanted vertical stressing due to contraction of the spring 46, during relative rotational movement between the spindle 26 and the equalizer 34, the annular ledge 52, formed on the pivotal element 26, and the annular flange 32 partially support the inside diameter of the first convolution adjacent each end of the spring.

Figure 4 illustrates another embodiment of the invention, however, only one half of the axle is shown it being understood that the axle is similarly constructed on the other end thereof. The numeral designations employed in Figure 4 are identical to those employed in Figures 1 to 3, except as hereinafter noted.

The bearing surface 30 is formed integral with and immediately adjacent the arm 24, and the cylindrical element 26a is formed to extend inboardly of said arm and it may, if desired, be extended as indicated in phantom at 26b to form a connected unit with a like element 26a extending inboardly from the similar arm 24 (not shown) on the other end of the axle 22. The helical spring 46 is positioned encircling the element 26a and it is connected at its opposite ends to the element 26a and the equalizer 34, respectively, by means of the welded spring clips 48 and 50. The annular ledges 52 and 53 are axially spaced on the element 26a to offer partial support for the inside diameter of the first convolution adjacent each end of the spring 46. Thus the axle 22 could be said to constitute transversely interconnected axially parallel shafts as indicated by 20 and 51, wherein shaft 51 may be a single connected unit or may be formed of axially spaced sections adjacent each end of the axle 22.

The side elevational view, Figure 2, illustrates the vehicle supporting assembly in a substantially loaded condition as indicated by the trailing position of the pivotal element 26, relative to the center portion 20 of the axle 22. In the unloaded condition the pivotal element 26 is substantially below and only slightly trailing the center portion 20. As the load is increased, the body 6 is lowered relative to ground level and the pivotal element 26 is caused to relatively rotate counterclockwise about the axis of the center portion 20. Also shock induced by either wheel assembly striking roadway impediments is operative to cause the pivotal elements 26 to rotate in the mentioned manner. This angular motion is resisted by the resulting bending stress induced in the fixed spring 46. Thus stress due to loading is absorbed by the spring and normal road shock is dissipated within the spring without affecting the vehicle body.

It is also important to note that the equalizers 34, disposed on each side of the truck, can assume various angular positions relative to each other and the relative angular motion of each equalizer is absorbed by the companion spring without affecting the position of the other equalizer.

I claim:

1. In a vehicle supporting assembly, a trailer body, an axle pivotally supporting said body, said axle consisting of a main portion in bearing engagement with said body, substantially coplanar distended elements attached to respective ends of said portion, an outboardly directed spindle member secured to each of said elements in aligned relationship with each other and spaced transversely from said portion, bearing means on the end of each member defined by an upset section inboardly of the end of said member, an equalizer having central pivotal connection to each member, spindles at respective ends of said equalizers rotatably supporting wheels aligned longitudinally of the body, and a coil spring embracing said spindle member and secured thereto at its inboard end and having rigid connection to said equalizer at the opposite end.

2. A wheel suspension for vehicles comprising bearing means designed for vehicle attachment, an axle having a portion journaled in said bearing means, a spindle offset from and parallel to said portion, an equalizer having provision for the attachment of a plurality of wheels rotatably secured to said spindle adjacent the end thereof, said equalizer being arranged to extend substantially transversely of the portion and spindle, and a coil spring embracing said spindle inboardly of said equalizer and secured to the spindle and having connection to said equalizer outboardly of said portion.

3. In combination; a vehicle axle comprising a main shaft, similarly distended portions adjacent each end of said shaft, an outwardly extended element attached to each portion and in parallel relation to said shaft, a side frame journaled on the end of each of said elements and disposed in approximate perpendicular relation to the elements and shaft, and a coil spring embracing said element and secured at opposite ends to the side frame and to the element, respectively.

4. A vehicle axle according to claim 3 wherein said coiled spring is positioned intermediate said portion and said side frame.

5. In a vehicle supporting assembly, a body, an axle center portion journalled to the body, an offset arm adjacent each end of said portion and secured thereto to rotate in unison in response to angular movement of said portion, a substantially cylindrical member outstanding from each of said arms, a side frame pivotally associated with each member adjacent said arm, a plurality of wheels rotatably spindled to said side frame, and a spring encircling each member and secured at opposite ends to said member and to said side frame.

6. In a vehicle supporting assembly, a main shaft, an auxiliary shaft having an axis spaced from the axis of the main shaft, a crank interconnecting the shaft, a coiled spring embracing said auxiliary shafts and secured at one end thereto, and a member pivotally connected to said auxiliary shaft and extending transversely of the mentioned axes, and a connection between said member and the other end of said spring, whereby, rotational movement of said member relative to said auxiliary shaft is cushioned and resisted.

7. In a vehicle supporting assembly, a body, centrally located and transversely aligned bearing means adjacent respective sides of the body, a main shaft journaled in said bearing means, another shaft having portions at respective ends of the main shaft parallel thereto and having a common axis spaced from the axis of the main shaft, a substantially longitudinal arm at respective sides of the body and having connections at opposite ends to the main shaft and related portion, respectively, bearing means at each end of the other shaft being defined by the shaft end and an inboard upset flange, an equalizer member at respective sides of the body extending longitudinally of the body and having journaled connection to said bearing means, transverse stub spindles connected to each member on opposite sides of the journal connection, a rotatable wheel mounted on each of the spindles, and coiled springs at opposite ends of the other shaft and embracing the other shaft, each spring having connections at opposite ends thereof to the adjacent portion and member, said spring being operative to cushion relative vertical movement of the body.

8. A vehicle axle assembly of identical construction on both ends thereof and on one end comprising a center portion designed for journaled connection to a related vehicle body, a transverse throw connected to the end of said portion, bearing means spaced from said portion and outstanding from said throw, an element inboardly extending from said throw and axially aligned with said bearing means, a side frame movably journaled to the bearing means, and a coiled spring surrounding said element and having spaced connection to said element and said side frame.

9. In a supporting assembly for a vehicle body, an axle having a portion journaled to said body, throws connected to respective ends of said portion, bearing means outstanding from the respective throws, elements coaxial with said bearing means and extending inboardly from the respective throws, wheel supporting side frames journaled to the related bearing means, and coiled springs surrounding the elements and having connection at opposite ends thereof to the elements and side frames.

10. In a vehicle supporting assembly, at least one side frame rotatably mounting a plurality of wheels, an axle having journaled connection to said frame, said axle comprising spaced interconnected shafts, one of said shafts being designed for rotatable connection to a related body, the other of said shafts having an axially spaced section aligned with the journaled connection, a coiled spring having portions of the section disposed within its convolutions and partially supported therefrom, and connection means attaching opposite ends of each coiled spring to the section and the side frame, respectively.

References Cited in the file of this patent

UNITED STATES PATENTS

| Number | Name | Date |
|---|---|---|
| 778,169 | Brink | Dec. 20, 1904 |
| 1,226,867 | Dempsey | May 22, 1917 |
| 1,919,033 | Noble | July 18, 1933 |
| 2,103,381 | Perkins et al. | Dec. 28, 1937 |
| 2,251,453 | Jackson | Aug. 5, 1941 |
| 2,386,988 | Sullivan | Oct. 16, 1945 |
| 2,426,513 | Linn | Aug. 26, 1947 |